Patented Mar. 6, 1945

2,370,651

UNITED STATES PATENT OFFICE 2,370,651

DIHYDROGENATED-β-ERYTHROIDINE AND PROCESSES FOR THE PRODUCTION THEREOF

Karl Folkers, Plainfield, and Frank R. Koniuszy, Elizabeth, N. J., assignors to Merck & Co., Inc., Rahway, N. J., a corporation of New Jersey No Drawing. Application April 30, 1942, Serial No. 441,228

16 Claims. (Cl. 260—236)

This invention relates to hydrogenated β-erythroidine, and to processes for its production.

The alkaloid, β-erythroidine, has been found to possess a potent curare-like action, and has also been found particularly useful for release of spasm and plastic muscular rigidity in patients afflicted with spastic paralysis, and for modification of the severity of metrazol convulsions, thereby preventing fracture in the convulsive therapy of the psychoses. It is being used with notable success in "shock therapy."

We have now discovered that the potency of β-erythroidine may be increased several fold, and its curare-like action rendered of greater duration, by hydrogenation.

According to our invention, an aqueous solution containing β-erythroidine or a corresponding alkali metal or alkaline earth metal salt, such as sodium β-erythroidinate, is hydrogenated in the presence of a hydrogenation catalyst.

Under the conditions described herein, competitive hydrogenation reactions may occur simultaneously with the production of dihydro-β-erythroidine and isomeric tetrahydro-β-erythroidines. Once the dihydro-β-erythroidine is produced, it is not further hydrogenated to a tetrahydro modification, under these conditions, but may be accompanied by isomeric tetrahydro-β-erythroidines.

The amount of hydrogen consumed for the production of dihydro-β-erythroidine is one mole, and for the competitive hydrogenation reactions the total consumption is between 1—2 moles.

In general, our preferred method of hydrogenation comprises treating an aqueous solution of β-erythroidine, or a corresponding alkali metal or alkaline earth metal salt, at from 10 to 45 lbs. of hydrogen for from 1 to 20 hours, depending upon the quantity of starting material used, in the presence of a hydrogenation catalyst, such as palladium, Raney nickel, platinum oxide, or the like.

Under these conditions, generally speaking, approximately one mole of hydrogen is consumed and a preponderant amount of the dihydro product is produced. When more than one mole of hydrogen is consumed, the hydrogenation product consists of a mixture of dihydro-β-erythroidine and two isomeric tetrahydro-β-erythroidines. Crude dihydro-β-erythroidine salt or hydrohalide may be recovered from the mixture by forming an acid salt or hydrohalide, as for instance, a hydrobromide, of such mixture, and purified by recrystallization, as for example, from absolute ethanol or a mixture of absolute ethanol and absolute ether.

The base, dihydro-β-erythroidine, which in its substantially pure form has specific rotation $(\alpha)_D^{25} = +102.5°$, and melting point about 85–86° C., may be recovered from its salt or hydrohalide, and may be treated with appropriate reagents for the production of other derivatives. The dihydro-β-erythroidine hydrobromide in its substantially pure form, has the specific rotation $(\alpha)_D^{25} = +106-107.5°$ and melting point about 231° C. (with decomp.).

According to our invention, the starting material may be β-erythroidine, a corresponding acid salt or hydrohalide, or a corresponding alkali metal or alkaline earth metal salt.

If an acid salt or hydrohalide of β-erythroidine is used as starting material, it may be first weakly alkalinized as by treatment with a solution of sodium bicarbonate, for example. The remaining base, β-erythroidine, may then be hydrogenated directly, or it may be reacted with a strong alkalinizing agent, such as sodium hydroxide, for instance, to form the corresponding alkali metal or alkaline earth metal salt of β-erythroidinic acid, which is then hydrogenated. Also, the acid salt or hydrohalide of β-erythroidine may be treated with the strong alkalinizing agent to directly form the alkali metal or alkaline earth metal salt of β-erythroidinic acid. Since β-erythroidine contains a lactone group which is susceptible to hydrolysis by strong alkalis, when the sodium or like alkali metal or alkaline earth metal salt is utilized in the process, the alkaline solution is acidified, after hydrogenation, in order to reform the lactone ring. The acidified solution may then be neutralized and extracted with an organic water-immiscible solvent. The residual alkaloidal base, hydrogenated β-erythroidine, remaining after removal of the solvent, may be isolated in the form of an acid salt or as a hydrohalide by treating a lower aliphatic alcohol solution thereof with the appropriate acidulating agent. Crystalline hydrogenated β-erythroidine salts are thus obtained. Acid salts or hydrohalides may also be produced by treating the hydrogenated β-erythroidine with the selected acidulating agent corresponding to the desired salt or hydrohalide.

The following examples illustrate methods of carrying out the present invention, but it is to be understood that these examples are given by way of illustration and not of limitation.

Example I

About 202 gms. of β-erythroidine hydrochloride were dissolved in 500 mls. of water. A little over 3 moles of sodium hydroxide (85.82 gms.) were dissolved in 300 mls. of water. The solutions were combined and 6.5 gms. of freshly prepared palladium catalyst were added. The mixture was shaken for 20 hours at 10–30 lbs. of hydrogen; (during this period nearly the theoretical amount of hydrogen appeared to be absorbed to form essentially a dihydro derivative and no further absorption of hydrogen occurred on additional shaking).

The catalyst was filtered with suction, and the filtrate was extracted four times with 50 ml. portions of chloroform. 90 mg. of colored impurities were obtained when the chloroform extracts were concentrated to dryness.

The aqueous alkaline solution was then acidified to pH 2.0 with concentrated hydrochloric acid. After standing for about 12 hours, the acidified solution was extracted with chloroform, and yielded 200 mg. of dark material. The acid solution was again alkalinized with sodium bicarbonate to pH 8.0, and extracted 22 times with 100 ml. portions of chloroform. The chloroform extracts were concentrated to dryness in vacuo. The residue was dried at approximately 1 mm. for eight hours. 145 gms. (82%) of a pale yellow gum were obtained. This was hydrogenated β-erythroidine. It was dissolved in 500 mls. of absolute ethanol, and treated with 42.6 gms. of anhydrous hydrogen bromide dissolved in 200 mls. of absolute ethanol. Crystals soon separated. 500 mls. of anhydrous ethyl ether were added carefully. The mass was kept at 10° C. for about 60 hours, after which the crystalline material was filtered, washed, and dried. 179 gms. (95.3%) of crude dihydro-β-erythroidine hydrobromides were thus obtained; specific rotation $(\alpha)_D^{25} = +90.7$, water. It was recrystallized once from 1200 mls. of refluxing absolute ethanol which was then concentrated to 600 mls. to start crystallization. Yield, 121.3 gms. of dihydro-β-erythroidine hydrobromide, specific rotation $(\alpha)_D^{25} = +97.4$, water.

Another recrystallization from 800 mls. of absolute ethanol (concentrated to 500 mls. and 100 mls. of anhydrous ethyl ether added) gave 89.9 gms. of dihydro-β-erythroidine hydrobromide, specific rotation $(\alpha)_D^{25} = +97.0$, water; melting point, 237° C. (dec.).

*Example II*

About 22.4 gms. of β-erythroidine hydrochloride and 7.24 gms. of sodium hydroxide (2½ moles) were dissolved in 100 mls. of water. 1.02 gms. of freshly prepared palladium catalyst was added, and the mixture was shaken at 10–40 lbs. of hydrogen for three hours. After shaking for two hours, substantially one mole of hydrogen was absorbed (equivalent to the formation of dihydro-β-erythroidine) and no further absorption occurred on continued shaking. The catalyst was filtered, and the filtrate extracted ten times with 25 ml. portions of chloroform. Concentration of the chloroform extracts to dryness yielded 54 mgs. of colored material which was discarded. The aqueous alkaline solution was acidified to pH 1.3 with concentrated hydrochloric acid, then allowed to stand overnight at room temperature. Extraction of the acid solution with chloroform yielded only 29 gm. of residue, which was discarded. The acid solution was rendered alkaline to pH 8.0 with sodium bicarbonate, and extracted ten times with 25 ml. portions of chloroform. Concentration of the chloroform extracts to dryness in vacuo, yielded 16.8 gms. (85%) of pale yellow hydrogenated β-erythroidine gum. It was dissolved in 50 mls. of absolute ethanol, and acidified with alcoholic hydrogen bromide to pH 3.0. Crystals formed spontaneously. 25 mls. of ether were added carefully. After standing for about 12 hours at 10° C., the crystals were filtered, washed, and dried. 17.8 gms. (84%) of crude dihydro-β-erythroidine hydrobromide were obtained; specific rotation, $(\alpha)_D^{25} = +96.7$, water. The material was recrystallized once from absolute ethanol. Yield, 16.0 gms. of dihydro-β-erythroidine hydrobromide, $(\alpha)_D^{25} = +98.7$, water; melting point 229–230° C. (dec.).

*Example III*

About 22.4 gms. of β-erythroidine hydrochloride and 8.7 gms. of sodium hydroxide were dissolved in 100 mls. of water, and 2.25 gms. of Raney nickel catalyst were added. The mixture was shaken for 1½ hours at 10–35 lbs. of hydrogen; (after shaking for 55 minutes, absorption of hydrogen ceased, but the amount of hydrogen absorbed was about 13% over the theoretical for one mole). The catalyst was filtered, and the filtrate was acidified to pH 3.6 with concentrated hydrochloric acid. To hasten re-lactonization, the acid solution was refluxed for one hour, then cooled to room temperature. Extraction of the acid solution with chloroform, yielded 54 mg. residue, which was discarded. The acid solution was then made alkaline with sodium bicarbonate to pH 8.0, and extracted 10 times with 25 ml. portions of chloroform. 16.2 gms. (81.6%) of hydrogenated β-erythroidine were obtained in the form of a gum. The gum was dissolved in 35 mls. of absolute ethanol, and acidified with 5.1 gms. of anhydrous hydrogen bromide dissolved in 25 mls. of absolute ethanol. Refrigeration for about 12 hours yielded 14.7 gms. of crude dihyrdo-β-erythroidine hydrobromide $(\alpha)_D^{25} = +107.0$, water. Recrystallization from absolute ethanol yielded 12 gms. of dihydro-β-eyrthroidine hydrobromide of $(\alpha)_D^{25} = +106.8$, water; melting point 230° C. (dec.).

*Example IV*

A total of 61 gms. of dry erythroidine base were obtained by dissolving 70 gms. of β-erythroidine hydrochloride in water, making the solution alkaline with sodium bicarbonate, extracting the alkaline solution with chloroform, and concentrating the chloroform solution to dryness. The 61 gms. of erythroidine were dissolved in 300 mls. of water containing 9.7 gms. of sodium hydroxide (1 mole). The solution was refluxed for 30 minutes, then the hot solution was concentrated to 150 mls. in vacuo and cooled to room temperature. 3.9 gms. of Adams' and Shriner's platinum oxide catalyst were added, and the mixture was hydrogenated at 10–40 lbs. of hydrogen for 12 hours. One and one-half moles of hydrogen were absorbed, which indicated that a mixture of hydrogenated β-erythroidine bases was obtained.

The catalyst was filtered, and the filtrate was extracted directly with chloroform, which yielded only 10 mg. of dark residue. The alkaline solution was acidified to pH 1.9 with concentrated hydrochloric acid and refluxed for 30 minutes to relactonize the alkaloidal base. The acid solution was then cooled to room temperature, and extracted six times with 50 ml. portions of chloroform. Concentration of the chloroform extracts to dryness, yielded 350 mg. of a brown gum which was discarded. The acid solution was made alkaline to pH 8.0 with sodium bicarbonate, and extracted ten times with 50 ml. portions of chloroform. The chloroform extracts were concentrated in vacuo, and 52.4 gms. (84.6%) of hydrogenated β-erythroidine gum were obtained. This was dissolved in 150 mls. of absolute ethanol, and treated with 15.2 gms. of anhydrous hydrogen bromide dissolved in 163 gms. of absolute alcohol. Crystals separated spontaneously, and the mush was refrigerated for 2½ hours. After filtering with suction, washing, and drying, 61 gms. of crude dihydro-β-erythroidine hydrobromide were obtained; specific rotation, $$(\alpha)_D^{25} = +98.3$$

water. The product was recrystallized once from absolute ethanol and 51.8 gms. of the dihydro-β-erythroidine hydrobromide were obtained; specific rotation $(\alpha)_D^{25} = +99.8$, water; melting point 230–231° C. (dec.).

Example V

About 500 gms. of β-erythroidine hydrochloride were dissolved in one liter of water. Two moles (130 gms.) of sodium hydroxide were dissolved in one liter of water and the two solutions were mixed. The resulting solution was diluted to a volume of 2400 ml. with water and then refluxed for 1½ hours. After cooling for about 12 hours, the alkaline solution was extracted ten times with 150 ml. portions of chloroform to remove any unchanged β-erythroidine. Concentration of the chloroform extracts to dryness yielded 6 gms. of unchanged β-erythroidine.

The remaining alkaline solution was freed of chloroform by concentration to a volume of 2100 mls. in vacuo; the concentrate was diluted back to 2400 mls. with water, 4 gms. of platinum oxide catalyst were added, and the mixture was hydrogenated at 10–42 lbs. of hydrogen. The hydrogenation was allowed to proceed until no more hydrogen was absorbed. The absorbed hydrogen amounted to approximately 1.8 moles. The catalyst was filtered and the filtrate was acidified to pH 1.9 with concentrated hydrochloric acid. The acid solution was refluxed for one hour. After cooling to room temperature, extraction with eight 200 ml. portions of chloroform yielded 3.7 gms. of dark residue after the solvent had been removed in vacuo.

The aqueous solution was made alkaline with sodium bicarbonate. The alkaline solution was extracted ten times with 250 ml. portions of chloroform. Removal of the chloroform from the extracts in vacuo, then drying the residue for about 12 hours in vacuo, yielded 176.6 gms. of hydrogenated β-erythroidine gum which amounted to only 40% of theory. Examination of the aqueous mother liquor showed that it was no longer alkaline but acidic in character. Therefore, it was again made alkaline with sodium bicarbonate and re-extracted with ten portions of 200 mls. of chloroform. Concentration of the chloroform extracts to dryness in vacuo left 193.6 gms. of hydrogenated β-erythroidine gum, or 42.6% of theory. Adding to the base previously obtained, the total amount of hydrogenated β-erythroidine obtained was 370.2 gms. or 82.6% yield.

The base was dissolved in 600 mls. of absolute ethanol and this solution was treated with 100.9 gms. of anhydrous hydrogen bromide dissolved in 875 gms. of absolute ethanol, followed by the careful addition of 2200 mls. of anhydrous ethyl ether. After refrigeration for about 12 hours, the salt was filtered, washed, and dried in the usual way to yield 427 gms. of crude dihydro-β-erythroidine hydrobromide (90%) with the specific rotation of $(\alpha)_D^{25} = +98.2$ and melting point 232° C. The product was recrystallized once from absolute ethanol and 386 gms. of the hydrobromide were obtained; rotation, $(\alpha)_D^{25} = +100.0$; melting point 232° C. (dec.).

Example VI

About 22.7 gms. of β-erythroidine hydrochloride were dissolved in 100 mls. of water containing 5.8 gms. of reagent sodium hydroxide (2 moles). The solution was refluxed for one hour, then cooled to room temperature and extracted eight times with 25 mls. portions of chloroform to remove any unchanged β-erythroidine, which resulted in 49 mg. of material. The aqueous solution of sodium β-erythroidinate was now concentrated to a volume of 80 mls. in vacuo to remove the last traces of chloroform. The concentrate was then made up to a volume of 100 mls. and 2.29 gms. of Raney nickel catalyst were added, and the solution was hydrogenated at 10–44 lbs. of hydrogen for 1½ hours. The amount of hydrogen absorbed was about 10% over the theory for one mole. After the catalyst was removed by filtration, the filtrate was acidified to pH 3.6 with concentrated hydrochloric acid, then refluxed for one hour. After standing for about 12 hours, the acid solution was extracted with eight 25 ml. portions of chloroform which removed 31 mgs. of dark residue. The acid solution was made alkaline with sodium bicarbonate, then extracted ten times with 50 ml. portions of chloroform. Concentration of the chloroform extracts to dryness yielded 18 gms. of hydrogenated β-erythroidine gum (90.4%). The base was dissolved in 36 mls. of absolute ethanol and acidified with 5.3 gms. of anhydrous hydrogenbromide in 25 mls. of ethanol. Addition of 5 mls. of anhydrous ethyl ether hastened crystallization which was allowed to progress for about 12 hours at 10° C. Filtration, washing, and drying of the crystals resulted in 18 gms. of crude dihydro-β-erythroidine hydrobromide of specific rotation $(\alpha)_D^{25} = +101.6$, water. Recrystallization from absolute ethanol yielded 16.3 gms. of the salt with the specific rotation $(\alpha)_D^{25} = 101.9$, water; and melting point 230° C. (dec.).

Example VII

About 5.5 gms. of β-erythroidine hydrochloride were dissolved in 25 mls. of water and the solution was rendered alkaline to litmus with sodium bicarbonate. 0.5 gm. of Raney nickel catalyst was added and the mixture was hydrogenated by shaking at 10–45 lbs. of hydrogen for one hour. After the absorption of about one mole of hydrogen, the catalyst was filtered and the filtrate was extracted directly ten times with 25 ml. portion of chloroform. Concentration of the chloroform extracts to dryness yielded 2.9 gms. of hydrogenated β-erythroidine base. It was dissolved in 10 mls. of absolute ethanol, and the solution was acidified with alcoholic hydrogen bromide and allowed to crystallize for about 12 hours at 10° C. The resulting crude dihydro-β-erythrodine hydrobromide (2.92 gms.) had a specific rotation of $(\alpha)_D^{25} = +99.0$, water; and melting point 237° C. (dec.).

Example VIII

About 22.4 gms. of β-erythroidine hydrochloride were dissolved in 100 mls. of water containing 5.8 gms. of sodium hydroxide (2 moles). Two grams of Raney nickel catalyst were added and the solution was cooled to 0° C. The cold solution was kept at 0° C. for 3 hours, during which it was hydrogenated at 10–35 lbs. of hydrogen. The amount of hydrogen absorbed was about 20% over one mole. The catalyst was filtered off and the filtrate was acidified to pH 3.2 with concentrated hydrochloric acid, then refluxed for one hour. The solution was cooled to room temperature, then extracted eight times with 25 ml. portions of chloroform to remove 152 mgs. of dark colored material. The acidic solution was made alkaline with sodium bicarbonate after which it was extracted ten times with 50 ml. portions of chloroform. Concentration of the chloroform extracts to dryness resulted in 18.6 gms. (93.5%) of hydrogenated β-erythroidine gum, which was dissolved in 37 mls. of absolute ethanol and acidified with 5.5 gms. of anhydrous hydrogen bromide dissolved in 25 mls. of absolute ethanol. Crystallization began spontaneously and 15 mls. of anhydrous ethyl ether were added to complete the crystallization. 23.6 gms. of crude dihydro-β-erythroidine hydrobromide (97%) were obtained on filtering, washing, and drying; specific rotation $(\alpha)_D^{25} = +95.0$, water; and melting point 236° C. (dec.).

Example IX

About 5 gms. of β-erythroidine hydrochloride were dissolved in 25 mls. of water and the solution was made alkaline to pH 8.0 with sodium bicarbonate, after which 0.5 gm. of Raney nickel catalyst were added. This solution was cooled to 0° C. and the reduction was carried out at this temperature by shaking at 10-45 lbs. of hydrogen for two hours. The amount of hydrogen absorbed was about 20% over one mole. The catalyst was filtered and the base was extracted directly from the filtrate with ten 25 ml. portions of chloroform. Concentration of the chloroform extracts to dryness resulted in 4.48 gms. of hydrogenated β-erythroidine base (100%), which was dissolved in 10 mls. of absolute ethanol and acidified with anhydrous hydrogen bromide in absolute ethanol. The yield of crude dihydro-β-erythroidine hydrobromide obtained was 4.68 gms.; specific rotation $(\alpha)_D^{25} = +92.9$, water; melting point 237° C. (dec.). The product could be further purified by repeated recrystallization.

Example X

Three moles (194 gms.) of sodium hydroxide were dissolved in 1500 mls. of water and 500 gms. of β-erythroidine hydrochloride were added. Raney nickel was then added, and the volume was adjusted to 2000 mls. with water and the solution was allowed to stand at room temperature for 2¾ hours. The amber-colored solution was then hydrogenated with 13-30 lbs. of hydrogen until the absorption of hydrogen had stopped; the amount absorbed was about 27% over the theory for one mole of hydrogen. The catalyst was filtered and washed with water and the clear yellow filtrate was acidified to pH 2.0 with concentrated hydrochloric acid then allowed to stand for about 48 hours at room temperature to complete relactonization.

The acid solution was made alkaline to pH 8.0, then extracted 23 times with 100 ml. portions of chloroform. Concentration of the chloroform extracts to dryness in vacuo, then drying with constant evacuation for about 12 hours at 2 mm., resulted in 378.4 gms. of crystalline crude dihydro-β-erythroidine base (87.5%). The crystalline base was dissolved in 800 mls. of absolute ethanol and 111.3 gms. of anhydrous hydrogen bromide (theory) dissolved in 500 mls. of absolute ethanol were added slowly with stirring. Immediate and heavy crystallization occurred after all of the hydrogen bromide had been added. After refrigerating for four hours at 10° C. (without the addition of ether), the material was filtered and dried in vacuo at room temperature. The resulting 421.4 gms. of white crystalline crude dihydro-β-erythroidine hydrobromide had a melting point of 230-1° C. and $(\alpha)_D^{25} = +101.0$, water. This 421 gm. batch was recrystallized by dissolving in five liters of refluxing alcohol (a 4-1 mixture of absolute and 95% ethanol) and concentrating the solution in vacuo until one liter of alcohol was removed. Crystallization then began and it was allowed to continue for about 12 hours at 10° C. The recrystallized material was filtered and dried in vacuo at room temperature which resulted in 325 gms. of crystals. These crystals were then dried at 100° C. in vacuo for one hour and the final yield obtained was 316 gms. of dihydro-β-erythroidine hydrobromide with melting point 230-1° C. and $(\alpha)_D^{25} = +105.4$, water.

The mother liquor from the recrystallization of the 421 gms. of material was concentrated to one-half of its volume and the concentrate was refrigerated for about 12 hours. This caused a second crop of 54 gms. of dihydro-β-erythroidine hydrobromide to separate and after drying with heat in vacuo, the product had a melting point of 231° C. and $(\alpha)_D^{25} = +106.8$, water.

Example XI

About 17 gms. of dihydro-β-erythroidine hydrobromide of specific rotation $(\alpha)_D^{25} = +105.6$ were dissolved in 100 mls. of water and the solution was made alkaline by the addition of sodium bicarbonate. Ten extractions with 10 ml. portions of chloroform removed the base which was isolated by concentrating the extracts to dryness in vacuo. This resulted in 13.1 gms. of crystalline base, which was recrystallized twice from ethyl ether anhydrous. The crystalline base had a constant melting point of 85-86° C., and specific rotation of $(\alpha)_D^{25} = +102.5$, in absolute ethyl alcohol.

Example XII

The crystalline dihydro-β-erythroidine base (8 gms.) obtained according to Example XI was dissolved in 20 mls. of absolute ethanol and this solution was acidified with alcoholic hydrogen chloride. Crystals soon separated and the mass was chilled for two hours. Filtration and drying yielded 8.3 gms. of dihydro-β-erythroidine hydrochloride which was recrystallized from absolute ethanol to yield 7.8 gms. of product with the constant melting point of 238° C. and $(\alpha)_D^{25} = +124.7$, water.

Example XIII

The base was recovered from 7.2 gms. of dihydro-β-erythroidine hydrochloride prepared according to Example XII, using the method of extraction as in Example XI. The crystalline base (6.3 gms.) thus obtained was dissolved in 25 mls. of absolute alcohol and was acidified with 2.9 gms. of 70% perchloric acid mixed with 10 mls. of absolute alcohol. Crystallization occurred immediately and the mixture was refrigerated at 10° C. for about 60 hours. After filtering, the crystals were recrystallized from absolute alcohol to give a product with the constant melting point of 235-6° C. (with decomposition) and the specific rotation $(\alpha)_D^{25} = +102.5$, water. This dihydro-β-erythroidine perchlorate was then recrystallized again but the constants were not altered.

Example XIV

Using the procedure described in Example XI, 4 gms. of crystalline dihydro-β-erythroidine base were obtained from 6 gms. of the dihydro-β-erythroidine perchlorate prepared according to Example XIII. This base was dissolved in 10 mls. of absolute alcohol, and was treated with 2.1 gms. of sodium iodide dissolved in 5 mls. of 95% alcohol, which was then followed by the addition of enough acetic acid to acidify the solution. Colorless needles of dihydro-β-erythroidine hydriodide separated readily and were filtered and dried after two hours of refrigeration at 10° C. The hydriodide thus obtained had a M. P. of 230–230.5° C., and $(\alpha)_D^{25} = +95.5$, water.

*Example XV*

From 4 gms. of dihydro-β-erythroidine hydriodide (Example XIV) 2.9 gms. of crystalline base were obtained, following the general procedure described in Example XI. A half gram of this base was converted to the hydrobromide derivative following the procedure described in Examples I to X. The hydrobromide obtained from this base that had been passed through the several derivatives was found to be identical with the dihydro-β-erythroidine hydrobromide used in recovering the base as described in Example XI.

It had a melting point of 230–1° C. (dec.), and $(\alpha)_D^{25} = +105.4$, water.

The 2.4 gms. of base remaining were dissolved in 10 mls. of absolute alcohol and treated with 1.2 gms. of salicylic acid dissolved in 5 mls. of absolute alcohol. To this solution were added 5 mls. of petroleum ether to hasten crystallization, and the solution was refrigerated at 10° C. for about 60 hours. The crystals were filtered and were recrystallized from absolute alcohol to yield dihydro-β-erythroidine salicylate with the constant melting point of 179–180° C., and $(\alpha)_D^{25} = +95.8$, water.

Substantially pure dihydro-β-erythroidine may also be obtained according to the procedure described in Example XVI.

*Example XVI*

Four grams of dihydro-β-erythroidine hydrobromide [$(\alpha)_D^{25} = +106.4$; melting point 231° C.] prepared according to Example X were mixed with 100 mls. of absolute ethanol, and this mixture was stirred by motor for 24 hours at room temperature, and filtered to remove the more soluble impurities. The remaining dihydro-β-erythroidine hydrobromide was dried at 100° C. in vacuo. The specific rotation of the thus purified hydrobromide was $(\alpha)_D^{25} = +107.6$; melting point 231°–231.5° C. Three grams of this product were mixed with 75 mls. of absolute ethanol. The mixture was sealed in an ampule and shaken continuously at room temperature for 24 hours, then filtered. The hydrobromide was dried at 100° C. in vacuo for one hour. The physical constants of the product, which was substantially 100% pure dihydro-β-erythroidine, were unchanged; specific rotation, $(\alpha)_D^{25} = +107.5$; melting point 231–231.5° C.

Modifications may be made in carrying out the present invention without departing from the spirit and scope thereof and we are to be limited only by the appended claims.

We claim:

1. A substance selected from the group consisting of dihydro-β-erythroidine, and salts and hydrohalides thereof.
2. Acid salts of dihydro-β-erythroidine.
3. Hydrohalides of dihydro-β-erythroidine.
4. Dihydro-β-erythroidine hydrobromide.
5. Dihydro-β-erythroidine hydrochloride.
6. Dihydro-β-erythroidine.
7. The process comprising hydrogenating a substance selected from the group consisting of β-erythroidine, alkali metal salts of β-erythroidine, and alkaline earth metal salts of β-erythroidine, in the presence of a hydrogenation catalyst, and under conditions such that substantially one mole of hydrogen is combined with each mole of starting material.
8. The process comprising hydrogenating a substance selected from the group consisting of β-erythroidine, alkali metal salts of β-erythroidine, and alkaline earth metal salts of β-erythroidine, in the presence of a hydrogenation catalyst, and under conditions such that substantially one mole of hydrogen is consumed per mole of starting material, and recovering dihydro-β-erythroidine.
9. The process comprising hydrogenating a substance selected from the group consisting of β-erythroidine, alkali metal salts of β-erythroidine, and alkaline earth metal salts of β-erythroidine, in the presence of a hydrogenation catalyst, and under conditions such that substantially one mole of hydrogen is consumed per mole of starting material, recovering an acid derivative of dihydro-β-erythroidine, and recovering dihydro-β-erythroidine from such acid derivative.
10. In a process for the production of a dihydrogenated derivative of β-erythroidine, the steps comprising hydrogenating a substance selected from the group consisting of β-erythroidine, alkali metal salts of β-erythroidine, and alkaline earth metal salts of β-erythroidine, in the presence of a hydrogenation catalyst, and under conditions such that substantially one mole of hydrogen is consumed per mole of starting material, and recovering an acid derivative of dihydro-β-erythroidine.
11. In a process for the production of a dihydrogenated derivative of β-erythroidine, the steps comprising hydrogenating β-erythroidine, in aqueous solution, in the presence of a hydrogenation catalyst, and under conditions such that substantially one mole of hydrogen is consumed per mole of β-erythroidine, and recovering an acid derivative of dihydro-β-erythroidine.
12. In a process for the production of a dihydrogenated derivative of β-erythroidine, the steps comprising hydrogenating an alkali metal salt of β-erythroidine, in aqueous solution, in the presence of a hydrogenation catalyst, and under conditions such that substantially one mole of hydrogen is consumed per mole of starting material, and recovering an acid derivative of dihydro-β-erythroidine.
13. In a process for the production of a dihydrogenated derivative of β-erythroidine, the steps comprising hydrogenating an alkaline earth metal salt of β-erythroidine, in aqueous solution, in the presence of a hydrogenation catalyst, and under conditions such that substantially one mole of hydrogen is consumed per mole of starting material, and recovering an acid derivative of dihydro-β-erythroidine.
14. The process comprising hydrogenating β-erythroidine, in aqueous solution, in the presence of a hydrogenation catalyst, and under conditions such that substantially one mole of hydrogen is consumed per mole of β-erythroidine, extracting the hydrogenation product with an organic solvent, removing the solvent, treating the solvent-free extract with an acidulating agent, and recovering dihydro-β-erythroidine from the salt thus produced.

15. The process comprising hydrogenating an alkali metal salt of β-erythroidine, in aqueous solution, in the presence of a hydrogenation catalyst, and under conditions such that substantially one mole of hydrogen is consumed per mole of starting material, acidifying the hydrogenation product, neutralizing, extracting the neutralized product with an organic solvent, removing the solvent, treating the solvent-free extract with an acidulating agent, and recovering dihydro-β-erythroidine from the salt thus produced.

16. The process comprising hydrogenating an alkaline earth metal salt of β-erythroidine, in aqueous solution, in the presence of a hydrogenation catalyst, and under conditions such that substantially one mole of hydrogen is consumed per mole of starting material, acidifying the hydrogenation product, neutralizing, extracting the neutralized product with an organic solvent, removing the solvent, treating the solvent-free extract with an acidulating agent, and recovering dihydro-β-erythroidine from the salt thus produced.

KARL FOLKERS.
FRANK R. KONIUSZY.